United States Patent
Sato

(10) Patent No.: US 7,272,312 B2
(45) Date of Patent: Sep. 18, 2007

(54) OPTICAL ROUTER

(75) Inventor: Chie Sato, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 234 days.

(21) Appl. No.: 10/751,913

(22) Filed: Jan. 7, 2004

(65) Prior Publication Data

US 2004/0141757 A1 Jul. 22, 2004

(30) Foreign Application Priority Data

Jan. 16, 2003 (JP) ............................ 2003-007723

(51) Int. Cl.
*H04J 14/00* (2006.01)
(52) U.S. Cl. ............................ 398/49; 398/47; 398/53
(58) Field of Classification Search ................... 398/46, 398/47, 49, 51–54; 370/389, 394, 395.4, 370/422, 415, 416, 414, 418
See application file for complete search history.

(56) References Cited

U.S. PATENT DOCUMENTS

| | | | | |
|---|---|---|---|---|
| 5,091,905 A * | 2/1992 | Amada | ......................... | 370/415 |
| 5,469,284 A * | 11/1995 | Haas | ............................ | 398/54 |
| 5,841,556 A * | 11/1998 | Hong et al. | .................... | 398/46 |
| 6,445,473 B1 * | 9/2002 | Suemura et al. | .............. | 398/48 |
| 6,532,089 B1 * | 3/2003 | Asahi | .......................... | 398/82 |
| 6,594,050 B2 * | 7/2003 | Jannson et al. | .............. | 398/52 |
| 6,721,315 B1 * | 4/2004 | Xiong et al. | ................. | 370/389 |
| 2002/0027914 A1 * | 3/2002 | Shinohara | .................... | 370/389 |

FOREIGN PATENT DOCUMENTS

| | | |
|---|---|---|
| JP | 8-163610 | 6/1996 |
| JP | 8-204675 | 8/1996 |
| JP | 2004-120696 | 4/2004 |

OTHER PUBLICATIONS

"Photonic Network Revolution—Technologies for realizing the world's most advanced information technology nation": published by the Secretariat, Photonic Internet Forum, within The Support Center for Advanced Telecommunications Technology Research, Foundation (Jan. 2002): 95-98.

* cited by examiner

*Primary Examiner*—Dalzid Singh
(74) *Attorney, Agent, or Firm*—Westerman, Hattori, Daniels & Adrian, LLP.

(57) ABSTRACT

An optical router for selecting optical paths for optical signals and outputting the optical signals. The optical router includes an optical delay device to delay the optical signals containing routing information in a header. An optical switch having input ports' and output ports receives optical outputs that are input from the optical delay device and outputs the optical signals. An optical-electrical conversion device converts the optical signals to electrical signals. A memory stores paths control information. A controller finds the path control information according to routing information output from the optical-electrical conversion device, determines destinations of the optical signal, and selects and assigns an input port in sequence from at least one input port having an output request to the output ports according to results of sorting a plurality of the output ports in ascending order of a number of output requests from the input ports.

9 Claims, 10 Drawing Sheets

OPTICAL ROUTER

BACKGROUND OF THE INVENTION

1. Field of the Invention

The present invention relates to an optical router which is disposed on an optical node basis, selects the optical path of an optical signal transmitting through such an optical transmission line as an optical fiber, and outputs the optical signal through the optical path, whereby an optical communications network is formed. More specifically, the present invention relates to an optical router capable of preventing optical signals from conflicting with each other and of efficiently allocating an optimum optical path.

2. Description of the Prior Art

An optical router is disposed on an optical node basis, selects the optical path of an optical signal transmitting through such an optical transmission line as an optical fiber, and outputs the optical signal through the optical path, whereby an optical communications network is formed. Literatures on the prior art related to optical routers include the following:

Japanese Laid-open Patent Application 1996-163610

Japanese Laid-open Patent Application 1996-204675

"Photonic Network Revolution—Technologies for realizing the world's most advanced information technology nations": published by the Secretariat, Photonic Internet Forum, within The Support Center for Advanced Telecommunications Technology Research, Foundation (January 2002): 95-98

FIG. 1 is a block diagram illustrating an example of such conventional optical routers (optical burst switches, in particular) as mentioned above.

In FIG. 1, optical switch 1 having three input ports and three output ports is controlled by controller 2 in terms of optical path selection. Optical switch 1 and controller 2 compose optical router 50.

The main signals, which are the optical input signals (optical burst signals) indicated by MS01 in FIG. 1, are input to the three input ports of optical switch 1. The three optical output signals indicated by MS02 in FIG. 1 are output from the three output ports of optical switch 1 to a subsequent-stage optical router or the like.

An optical control signal carrying routing information indicated by CS01 in FIG. 1 is input to controller 2. The electrical output signal of controller 2 indicated by SS01 is coupled with the control terminal of optical switch 1. The optical output signal of controller 2 is output to a subsequent-stage optical router or the like, as the optical control signal indicated by CS02.

Now the behavior of an example of a conventional optical router illustrated in FIG. 1 is described by referring to FIG. 2, wherein FIG. 2 is a block diagram explaining the behavior of the example of the conventional optical router shown in FIG. 1. In FIG. 2, optical switch 1, controller 2 and optical router 50 are the same as those shown in FIG. 1. The details of interconnection are also the same as those of the example of the conventional optical router illustrated in FIG. 1.

First, an optical control signal indicated by CS11 in FIG. 2 is transferred prior to such a main signal (optical input signal) as indicated by SG11 in FIG. 2, and is input to controller 2.

Controller 2 then converts the optical control signal thus input, to an electrical control signal, as well as produces a control signal as indicated by SS11 in FIG. 2, according to the routing information that the electrical control signal carries, in order to select the optical path of optical switch 1.

Now assume, for example, that the abovementioned routing information contains the information that the main signal is input from the input port of optical switch 1 indicated by PT11 in FIG. 2, and is output from the output port of optical switch 1 indicated by PT12. Then, controller 2 controls optical switch 1 to select an optical path as indicated by SR11 in FIG. 2.

When such optical path selection as discussed above is completed, such a main signal as indicated by SG11 in FIG. 2 is input to the input port of optical switch 1 indicated by PT11. Consequently, the main signal is output from an output port indicated by PT12, as indicated by SG12 in the figure.

As a result, by previously selecting the optical path of optical switch 1 that composes optical router 50 using an optical control signal, then transmitting an optical input signal which is the main signal, it is possible to select and control the paths of optical signals.

However, the example of the conventional optical router illustrated in FIG. 1 has been problematic in that an optical control signal with a shifted transmission time must be separately transmitted in addition to the optical signal that is the main signal.

For this reason, the patent application 2002-284970 filed by the applicant of the application concerned describes an example of an optical router wherein an optical signal being transmitted is split into a header part and a data part and routing information, such as a destination address, is added to the header part according to the routing information, thereby permitting a selection to be made from given optical paths.

FIG. 3 is a block diagram illustrating an example of a prior art optical router described in the patent application 2002-284970.

Indicated in FIG. 3 are optical delay means 3 for delaying an optical input signal by a specific length of time by transmitting the signal through an optical loop or the like; optical-electrical conversion means 4, such as a photodiode or phototransistor; optical switch 5 provided with three input ports and three output ports; controller 6 for controlling optical path selection made by optical switch 5; and memory 7 wherein path control information, such as routing tables, is stored. In addition, optical delay means 3, optical-electrical conversion means 4, optical switch 5, controller 6 and memory 7 compose optical router 51.

In FIG. 3, the three optical input signals (optical burst signals) indicated by SG21 are input to the three input ends of optical delay means 3, as well as to the three input ends of optical-electrical conversion means 4.

Optical output signals from the three output ends of optical delay means 3 are input to the three input ports of optical switch 5, and the three optical output signals indicated by SG22 in FIG. 3 are output from the three output ports of optical switch 5.

The electrical output signal of optical-electrical conversion means 4 is coupled with controller 6, and the electrical output signal of controller 6 indicated by SS21 in FIG. 3 is coupled with the control terminal of optical switch 5. In addition, the electrical output signal of controller 6 is mutually coupled with memory 7.

Now the behavior of the example of the prior art optical router illustrated in FIG. 3 is described. Optical input signals, which are indicated by SG21 in FIG. 3 and contain routing information, such as destination addresses, added to the header parts thereof, are delayed by specific lengths of time at optical delay means 3.

The optical input signals indicated by SG21 in FIG. 3, which contain routing information, such as destination addresses, added to the header parts thereof, are converted to electrical signals at optical-electrical conversion means 4 and input to controller 6.

Controller 6 extracts the routing information from the electrical signal being input from optical-electrical conversion means 4, finds path control information stored in memory 7 according to the routing information, specifies a subsequent-stage optical router (output port) appropriate for the entered optical signals to transmit to the destination through the shortest path, and accordingly selects from the optical paths of optical switch 5.

For example, controller 6 controls optical switch 5 so that an optical path is selected in such a manner that an optical input signal is input to the input port of optical switch 5 indicated by PT21 in FIG. 3, and is output from the output port of optical switch 5 indicated by PT22.

If such an optical input signal as is properly delayed by optical delay means 3 after the completion of such optical path selection as described above is input to the input port of optical switch 5 indicated by PT21 in FIG. 3, the optical output signal will be output from the output port indicated by PT22.

This means that by adding routing information, such as a destination address, to the header part of an optical signal, it is possible to make optical path selections according to the routing information. In this case, it is not necessary to separately transmit an optical control signal as shown in the example of the prior art optical router illustrated in FIG. 1.

In such examples of the prior art optical router as illustrated in FIGS. 1 and 3, however, no consideration is given as to how to avoid a conflict between optical signals when a plurality of optical signals are input simultaneously. Consequently, a conflict between these optical input signals will occur if an attempt is made to output the simultaneously entered plural optical input signals onto the same output port. This example of the prior art optical router has been problematic since failures may occur such as a specific optical signal or signals not being transmitted at all (or being blocked).

Let us take FIG. 4 as an example, which is a block diagram explaining problems inherent in the example of the prior art optical router illustrated in FIG. 1, where optical switch 1, controller 2 and optical router 50 are identical with those shown in FIG. 1.

If two optical input signals indicated by SG31 and SG32 in FIG. 4 are simultaneously input to the input ports of optical switch 1 indicated by PT31 and PT32 and an attempt is made to output the two signals to the one and the same output port indicated by PT33, such a conflict as indicated by CL31 occurs, causing the abovementioned failure.

Let us take FIG. 5 as another example, which is a block diagram explaining problems inherent in the example of the prior art optical router illustrated in FIG. 3, where optical delay means 3, optical-electrical conversion means 4, optical switch 5, controller 6, memory 7 and optical router 51 are identical with those shown in FIG. 3.

If two optical input signals indicated by SG41 and SG42 in FIG. 5 are simultaneously input to the input ports of optical switch 5 indicated by PT41 and PT42 and an attempt is made to output the two signals to the one and the same output port indicated by PT43, such a conflict as indicated by CL41 occurs, causing the abovementioned failure.

SUMMARY OF THE INVENTION

An object of the present invention is to realize an optical router whereby it is possible to avoid a conflict between optical signals and to efficiently allocate an optimum optical path.

DETAILED DESCRIPTION OF THE PREFERRED EMBODIMENTS

Figure 6:
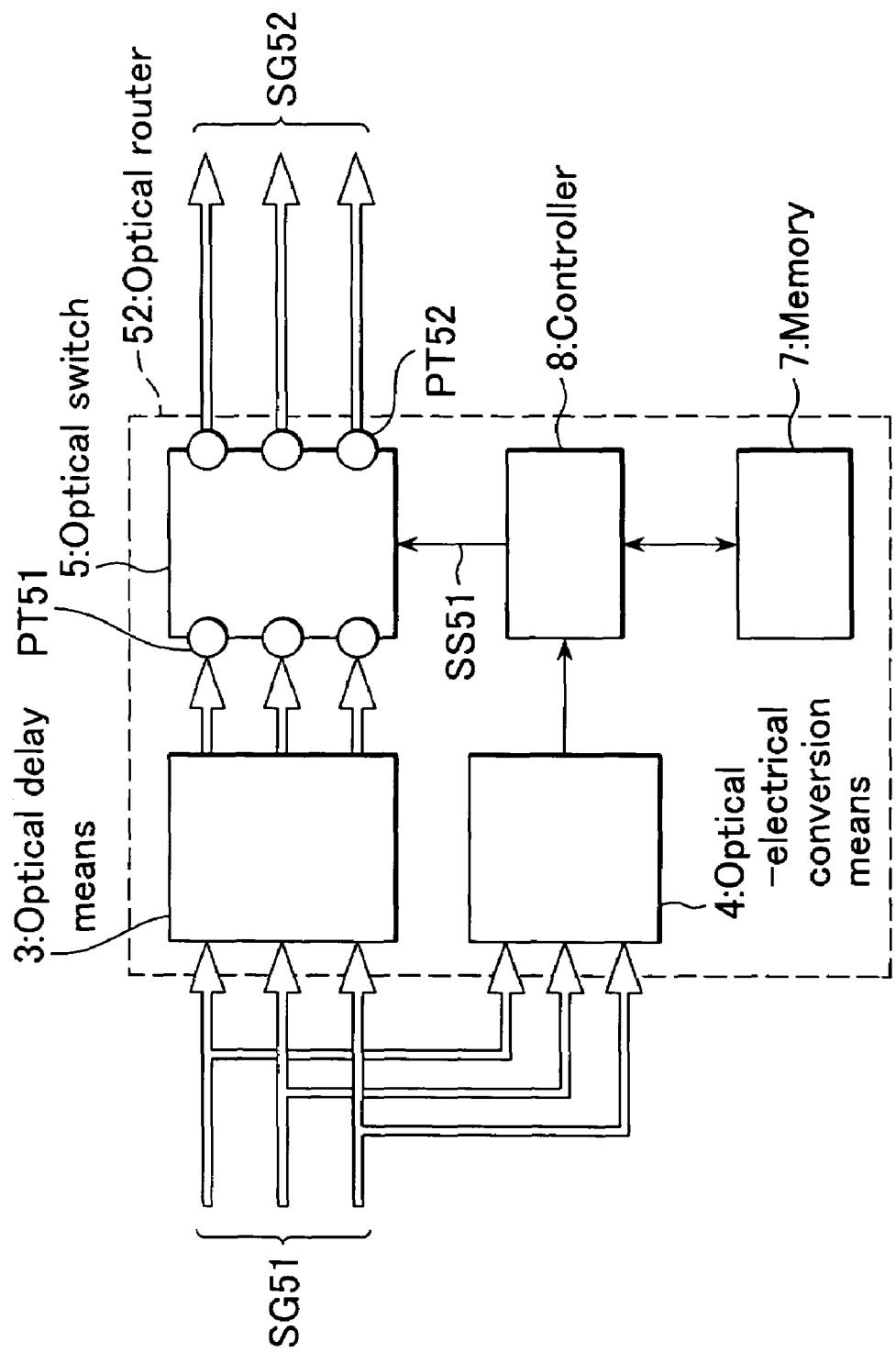
FIG. 6 is a block diagram illustrating one embodiment of an optical router in accordance with the present invention.

Preferred embodiments of the present invention are described hereinafter in detail by referring to the accompanying drawings, wherein FIG. 6 is a block diagram illustrating one embodiment of an optical router in accordance with the present invention.

Figure 1:
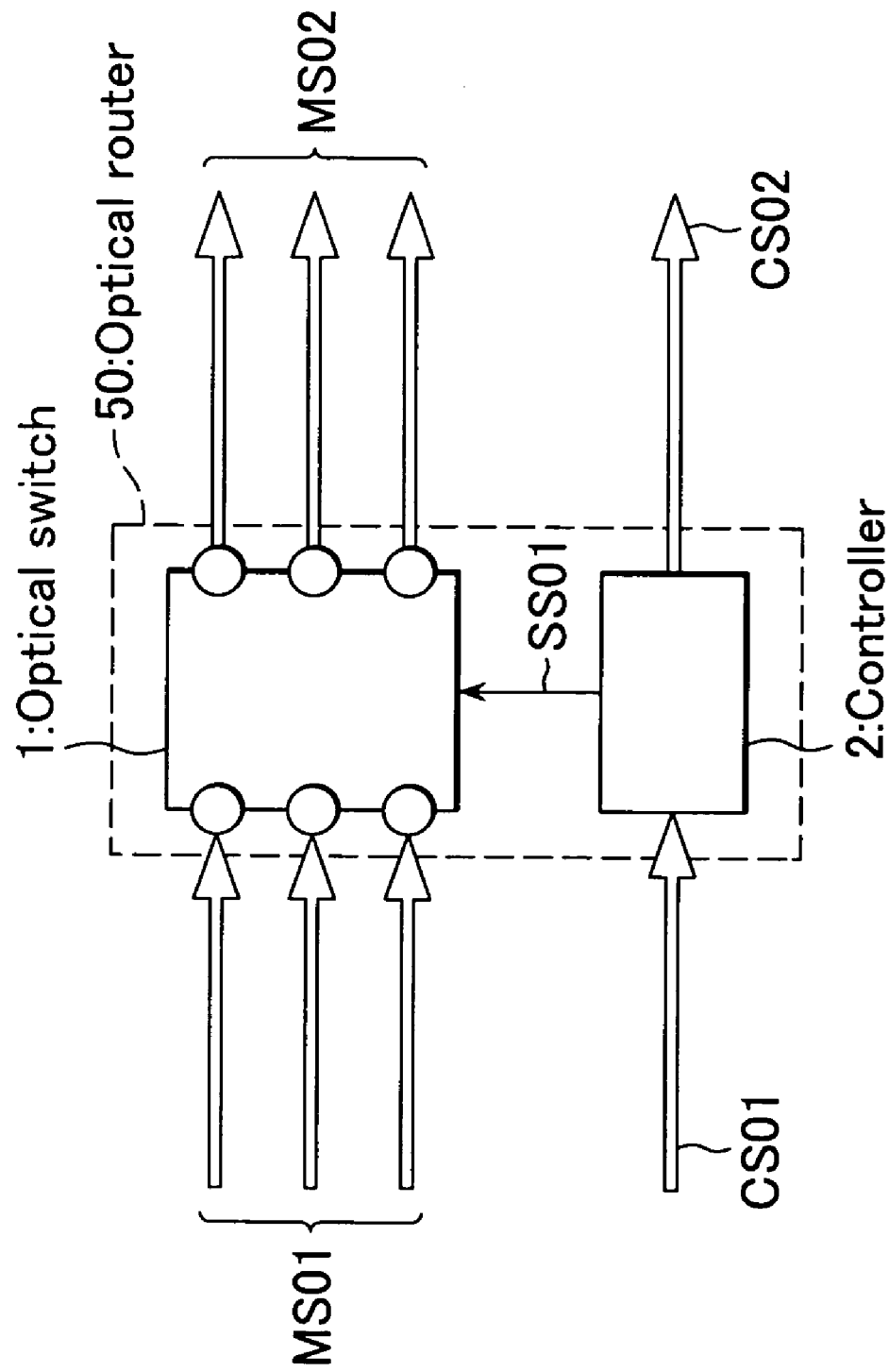
FIG. 1 is a block diagram illustrating an example of a prior art optical router.
Figure 2:
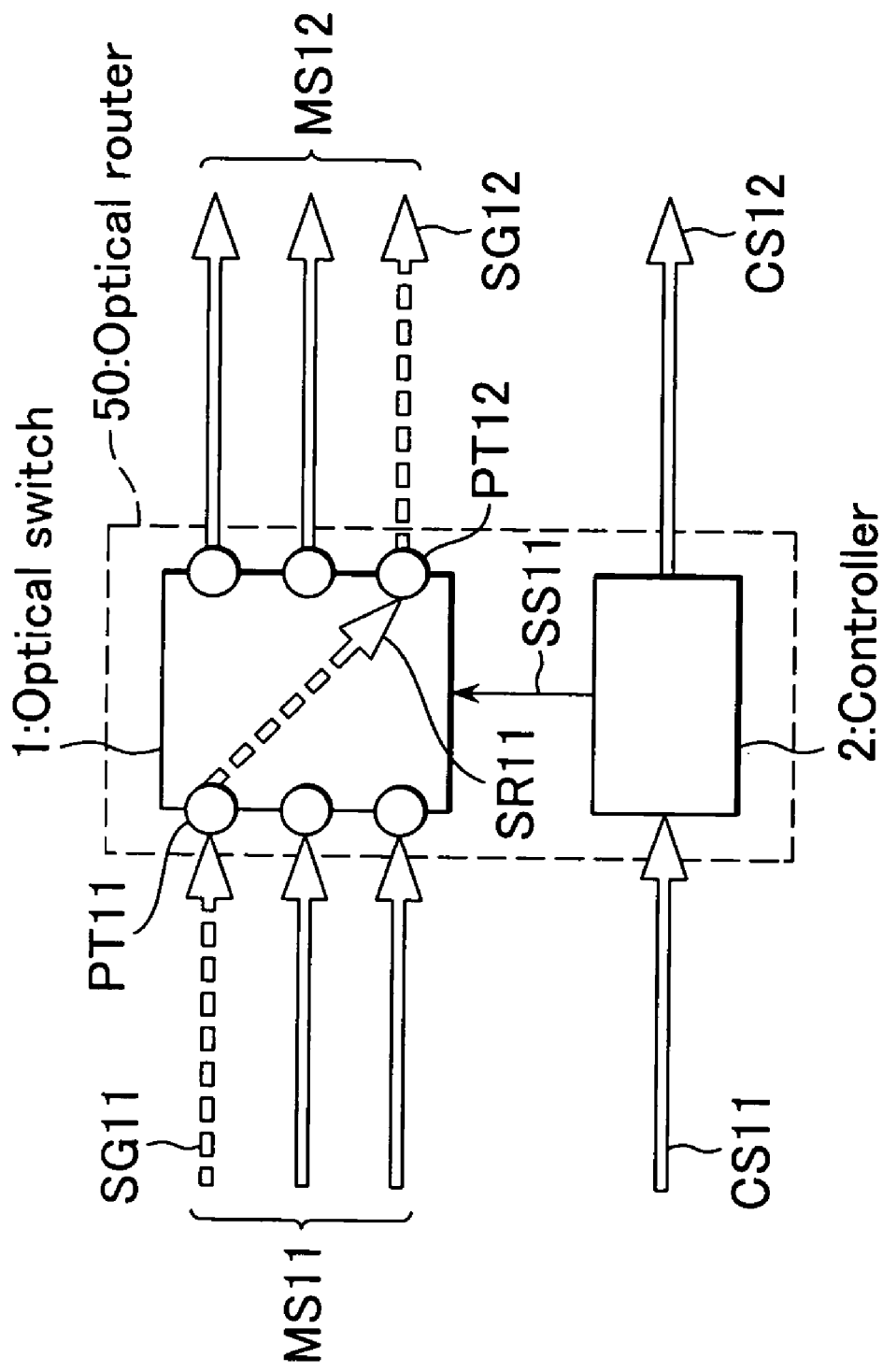
FIG. 2 is a block diagram explaining the behavior of the example of the prior art optical router.
Figure 3:
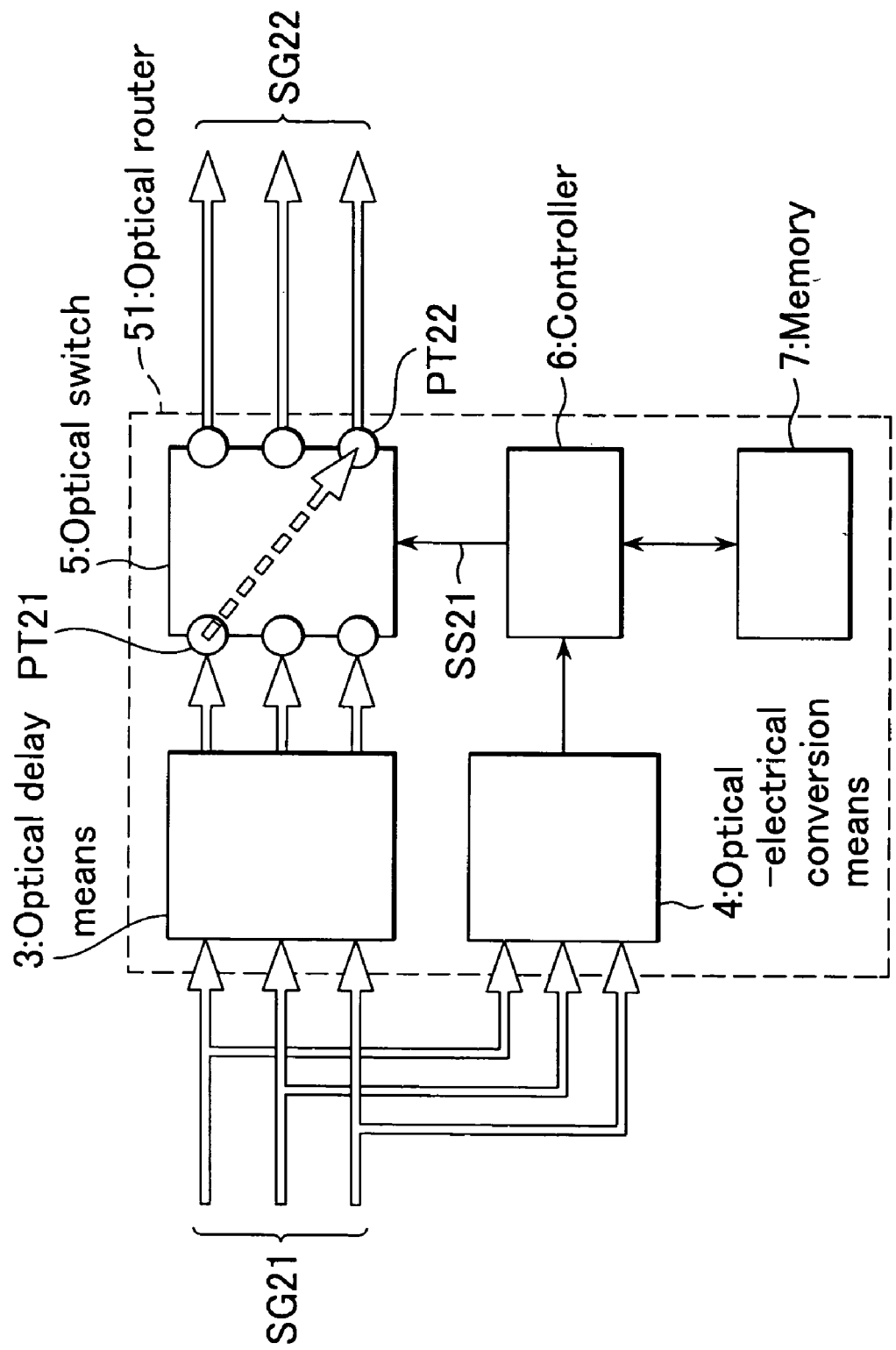
FIG. 3 is another block diagram illustrating an example of a prior art optical router.
Figure 4:
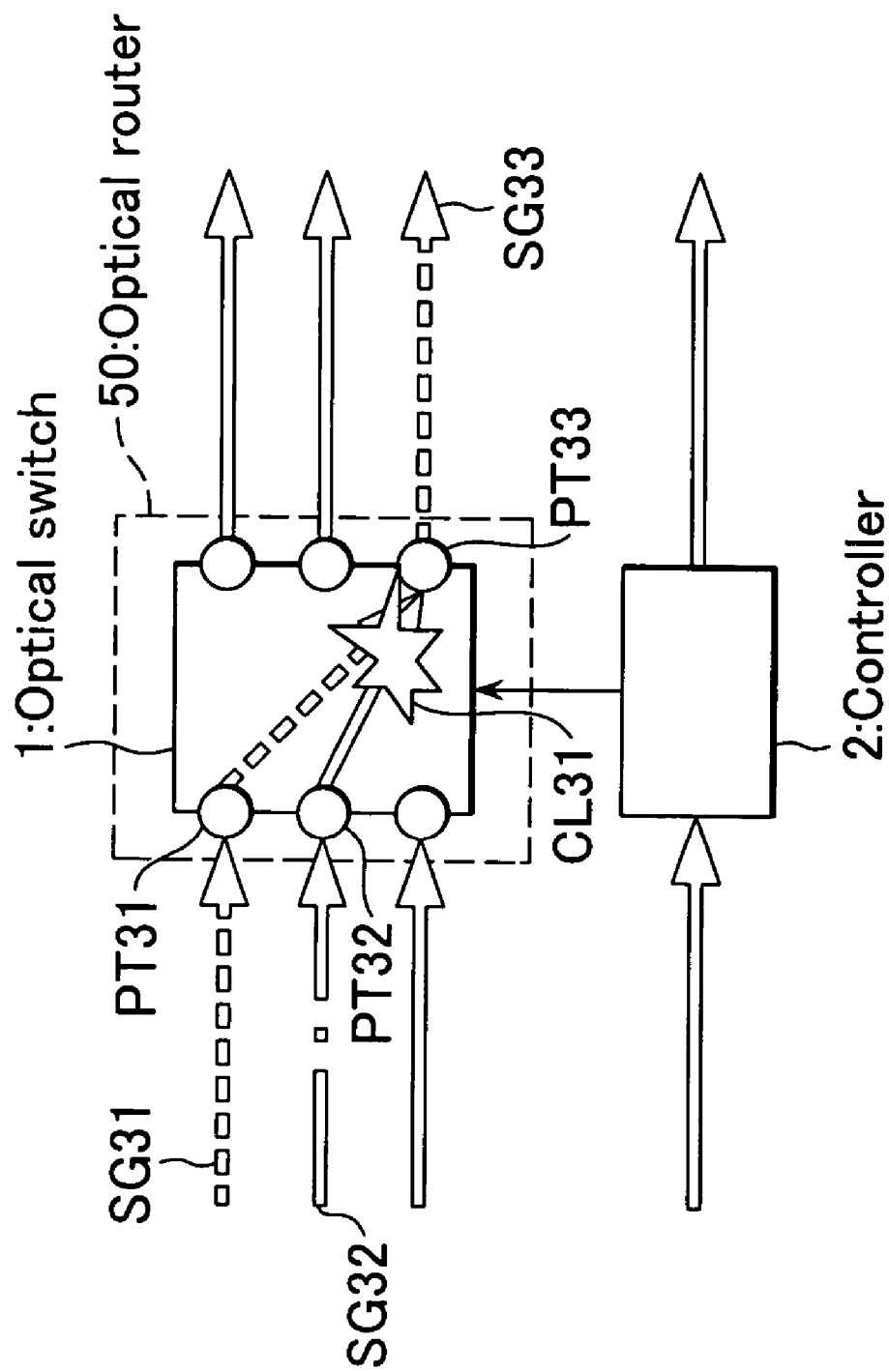
FIG. 4 is a block diagram explaining problems inherent in the example of the prior art optical router.
Figure 5:
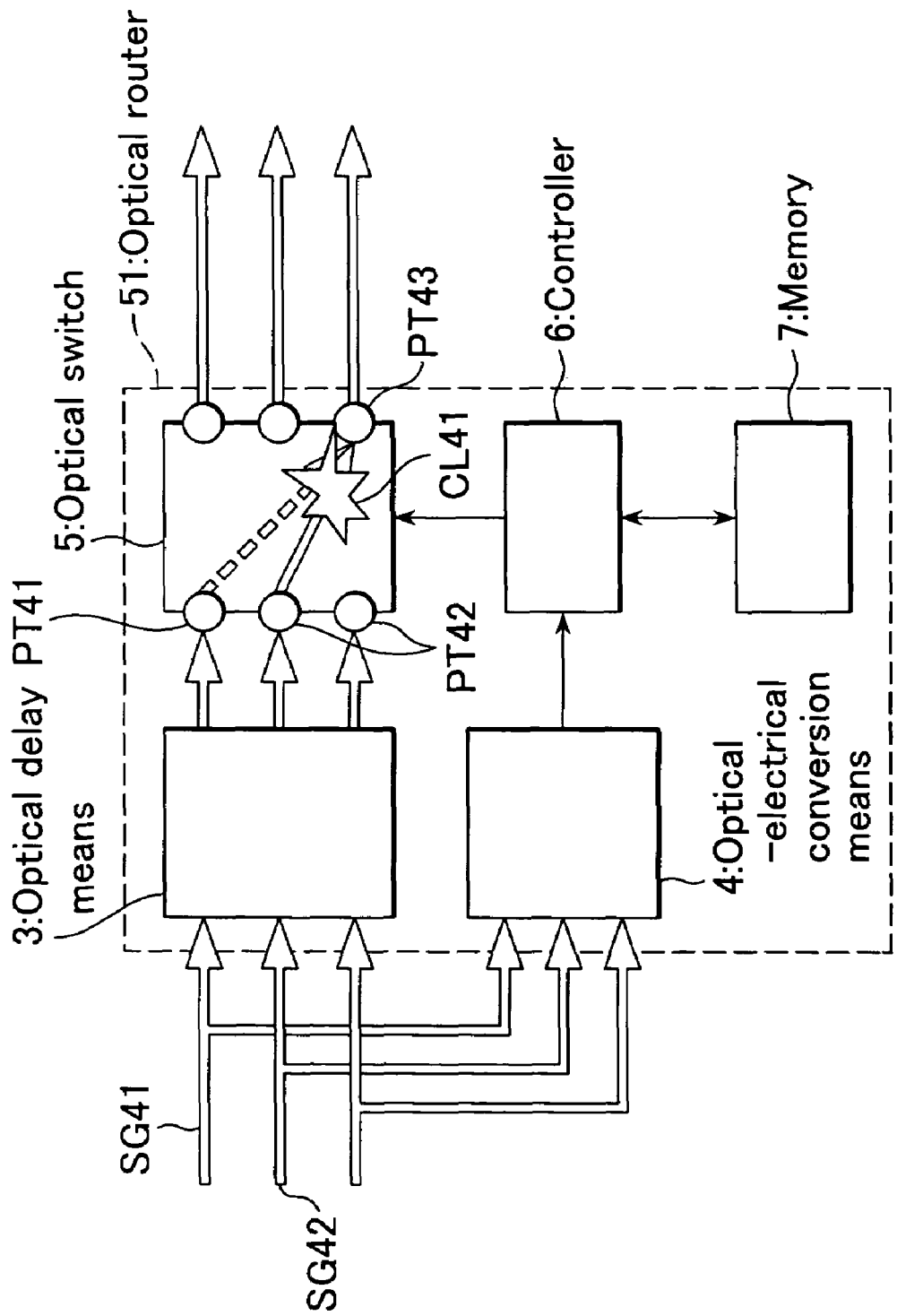
FIG. 5 is another block diagram explaining problems inherent in the example of the prior art optical router.

In FIG. 6, optical delay means 3, optical-electrical conversion means 4, optical switch 5 and memory 7 are identical with those shown in FIG. 3, wherein FIG. 6 further includes controller 8 for controlling the optical path selection of optical switch 5. In addition, optical delay means 3, optical-electrical conversion means 4, optical switch 5, memory 7 and controller 8 compose optical router 52.

Three optical input signals (optical burst signals) indicated by SG51 in FIG. 6 are input to the three input ends of optical delay means 3, as well as to the three input ends of optical-electrical conversion means 4.

Optical output signals from the three output ends of optical delay means 3 are input to the three input ports of optical switch 5, and the three optical output signals indicated by SG52 are output from the three output ports of optical switch 5.

The electrical output signal of optical-electrical conversion means 4 is coupled with controller 8, and the electrical output signal of controller 8 indicated by SS51 is coupled with the control terminal of optical switch 5. In addition, the electrical input-output signal of controller 8 is mutually coupled with memory 7.

Now the behavior of the embodiment illustrated in FIG. 6 is described. The embodiment illustrated in FIG. 6 is the same as the example of the prior art optical router illustrated in FIG. 3 in terms of basic behaviors. That is, optical input signals which are indicated by SG51 in FIG. 6 and contain routing information, such as destination addresses, added to the header parts thereof, are delayed by specific lengths of time at optical delay means 3.

On the other hand, the optical input signals which are indicated by SG51 in FIG. 6 and contain routing information, such as destination addresses, added to the header parts thereof are converted to electrical signals at optical-electrical conversion means 4 and input to controller 8.

Controller 8 extracts the routing information from an electrical signal being input from optical-electrical conversion means 4, finds path control information stored in memory 7 according to the routing information, specifies a subsequent-stage optical router (output port) appropriate for the entered optical signals to transmit to the destination through the shortest path, and accordingly selects from the optical paths of optical switch 5.

For example, controller 6 controls optical switch 5 so that an optical path is selected in such a manner that the optical input signal is input to the input port of optical switch 5 indicated by PT51 in FIG. 6, and is output from the output port of optical switch 5 indicated by PT52.

If such an optical input signal as is properly delayed by optical delay means 3 after the completion of such optical path selection as described above is input to the input port of optical switch 5 indicated by PT51, the optical output signal will be output from the output port indicated by PT52.

Furthermore, the avoidance of conflict between optical signals when a plurality of optical signals are simultaneously input is explained by referring to FIGS. 7 to 15.

Figure 7:
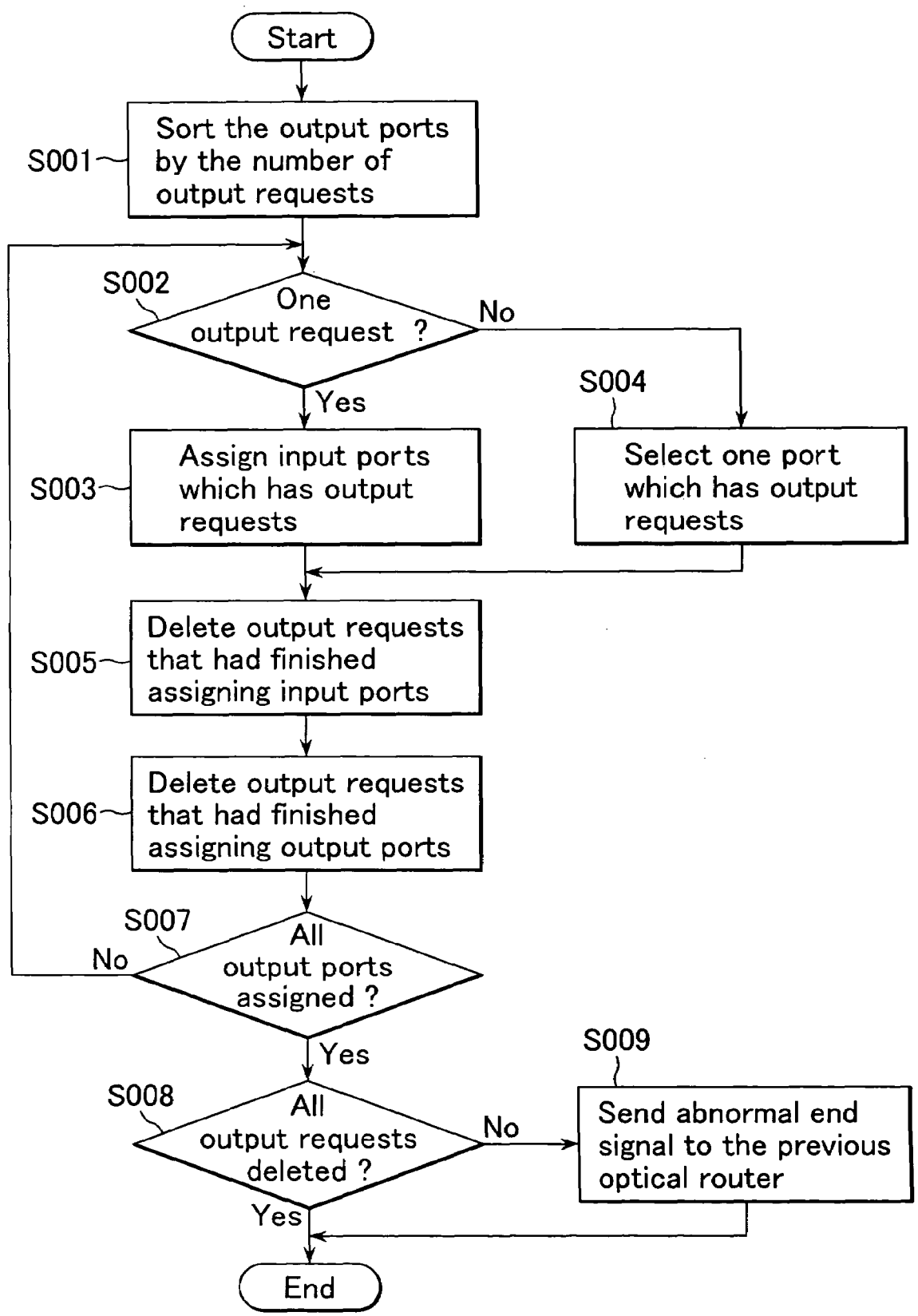
FIG. 7 is a flowchart explaining the conflict avoidance action of a controller.

FIG. 7 is a flowchart explaining the conflict avoidance action of controller 8, FIGS. 8 to 11 are schematic views explaining examples of conflict avoidance action when optical input signals are simultaneously applied to the three input ports of optical switch 5, and FIGS. 12 to 15 are schematic views explaining other examples of conflict avoidance action when optical input signals are simultaneously applied to the three input ports of optical switch 5.

In step S001 of FIG. 7, controller 8 sorts the output ports of optical switch 5 in ascending order of the number of output requests from the input ports of optical switch 5.

Figure 8:
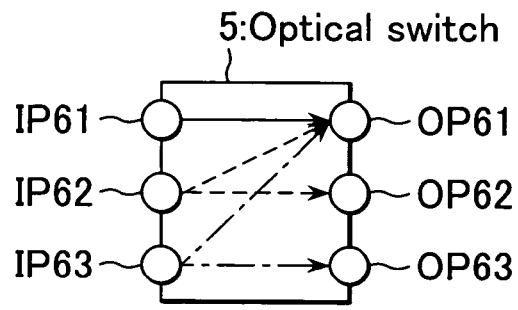
FIG. 8 is a schematic view explaining an example of conflict avoidance action when optical input signals are simultaneously input to the three input ports of an optical switch.

Let us take FIG. 8 as an example, which illustrates the relationship of output requests between the input ports indicated by IP61, IP62 and IP63 and the output ports indicated by OP61, OP62 and OP63. Each arrow in FIG. 8 represents an output request to such an output port to which an optical signal can be output from the input port of optical switch 5, or in other words, an output request to such an output port with which the shortest path can be established.

More specifically, the arrangement of optical routers differs depending on the configuration of an optical communications network. Therefore, there is a case where there are a plurality of subsequent-stage optical routers appropriate for an entered optical signal to transmit to the destination through the shortest path. Consequently, there may be a case where an output request is made from a single input port to a plurality of output ports.

In the example shown in FIG. 8, the output port indicated by OP61 has three output requests from the three input ports indicated by IP61, IP62 and IP63. Likewise, the output ports indicated by OP62 and OP63 have output-requests one each from the two input ports indicated by IP62 and IP63.

Consequently, sorting the output ports of optical switch 5 in ascending order of the number of output requests from the input ports of optical switch 5 in step S001 of FIG. 7 results in the order of OP62 (one output request), OP63 (one output request) and OP61 (three output requests), as shown in FIG. 8.

In step S002 of FIG. 7, controller 8 identifies the first output port from the results of sorting to determine whether the number of output requests to the first output port is "one".

If the number of requests to the abovementioned output port proves to be "one" in step S002 of FIG. 7, controller 8 assigns the only input port that has an output request to this output port, in step S003, then goes to step S005.

If the number of output requests to the output port proves to be "not one," or in other words "more than one", in step S002 of FIG. 7, controller 8 selects one input port from a plurality of input ports having output requests to the output port in step S004, assigns that input port to the output port, then goes to step S005.

In step S005 of FIG. 7, controller 8 cancels the output request from the assigned input port, and also cancels the output request to the output port to which the input port has been assigned, in step S006.

In step S007 of FIG. 7, controller 8 determines whether or not input ports have been assigned to all of the output ports. If not, controller 8 goes back to step S002. If the assignment is complete, controller 8 goes to step S008.

Finally, in step S008 of FIG. 7, controller 8 determines whether all output requests from the input ports are cancelled. If not, controller 8 takes measures, such as sending information indicating an abnormal end of conflict avoidance, to the source optical router in step S009.

For example, sorting the output ports in step S001 of FIG. 7 results in the order of OP62 (one output request), OP63 (one output request) and OP61 (three output requests), as shown in FIG. 8. Thus, the number of outputs to the first output port indicated by OP62 in FIG. 8 proves to be "one."

Figure 9:
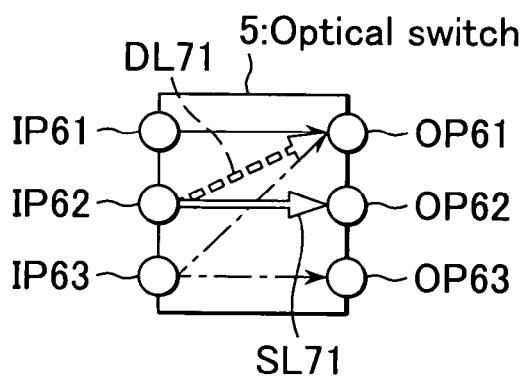
FIG. 9 is another schematic view explaining an example of conflict avoidance action when optical input signals are simultaneously input to the three input ports of an optical switch.

Consequently, in step S003 of FIG. 7, controller 8 assigns the only input port indicated by IP62 in FIG. 9 that has an output request to the output port indicated by OP62, as indicated by SL71 in FIG. 9.

Then, in steps S005 and S006 of FIG. 7 controller 8 cancels the output request from the assigned input port indicated by IP62 in FIG. 9, as indicated by DL71 in FIG. 9. By going through these steps, the relationship of output requests illustrated in FIG. 8 is changed to the one shown in FIG. 10.

Figure 10:
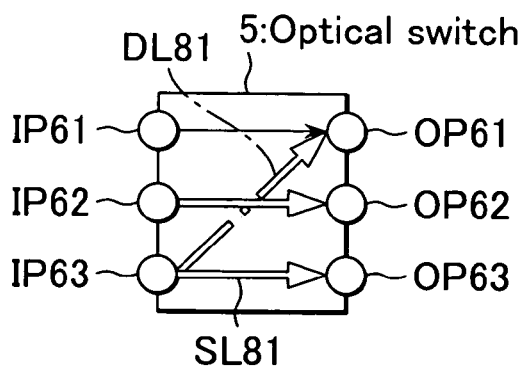
FIG. 10 is yet another schematic view explaining an example of conflict avoidance action when optical input signals are simultaneously input to the three input ports of an optical switch.

Likewise, the number of output requests to the output port indicated by OP63 in FIG. 10, which is the second output port, is also "one."

Consequently, in step S003 of FIG. 7, controller 8 assigns the only input port indicated by IP63 in FIG. 10 that has an output request to the output port indicated by OP63, to that output port, as indicated by SL81.

Then, in steps S005 and S006 of FIG. 7, controller 8 cancels the output request from the assigned input port indicated by IP63 in FIG. 10, as indicated by DL81 in FIG. 10. By going through these steps, the relationship of output requests illustrated in FIG. 10 is changed to the one shown in FIG. 11.

Figure 11:
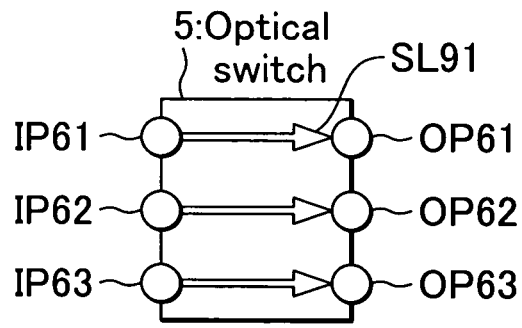
FIG. 11 is yet another schematic view explaining an example of conflict avoidance action when optical input signals are simultaneously input to the three input ports of an optical switch.

Finally, the number of output requests to the output port indicated by OP61 in FIG. 11, which is the third output port, has been decreased from "three" to "one" due to steps S005 and S006 of FIG. 7 taken for the output ports indicated by OP62 and OP63 in FIG. 11.

Consequently, in step S003 of FIG. 7, controller 8 assigns the only input port indicated by IP61 in FIG. 11 that has an output request to the output port indicated by OP61, to that output port, as indicated by SL91.

As an ultimate result, the input ports indicated by IP61, IP62 and IP63 in FIG. 11 are efficiently assigned to the output ports indicated by OP61, OP62 and OP63 in FIG. 11, thus making it possible to prevent optical signals from conflicting with each other.

Figure 12:
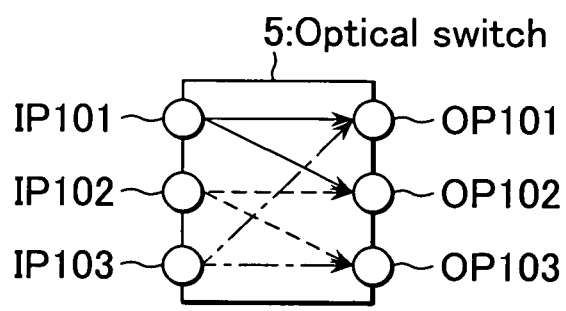
FIG. 12 is yet another schematic view explaining an example of conflict avoidance action when optical input signals are simultaneously input to the three input ports of an optical switch.

Let us take FIG. 12 as another example, which is a schematic view illustrating the relationship of output requests between the input ports indicated by IP101, IP102 and IP103 and the output ports indicated by OP101, OP102 and OP103. Each arrow in FIG. 12 represents an output request to such an output port to which an optical signal can be output from the input port of optical switch 5, or in other words, an output request to such an output port with which the shortest path can be established.

In this relationship of output requests, sorting the output ports in step S001 of FIG. 7, for example, results in the order of OP101 (two output requests), OP102 (two output requests) and OP103 (two output requests), as shown in FIG. 12. Therefore, the number of output requests to the output port indicated by OP101 in FIG. 12, which is the first output port, is "two."

Figure 13:
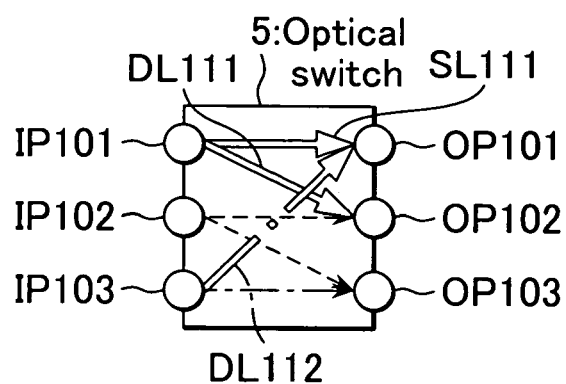
FIG. 13 yet is another schematic view explaining an example of conflict avoidance action when optical input signals are simultaneously input to the three input ports of an optical switch.

Consequently, in step S004 of FIG. 7, controller 8 assigns the only input port indicated by IP101 in FIG. 13 that has an output request to the output port indicated by OP101, to that output port, as indicated by SL111.

Then, in steps S005 and S006 of FIG. 7, controller 8 cancels the output request from the assigned input port indicated by IP101 in FIG. 13 as indicated by DL111 in FIG. 13, as well as the output request to the output port indicated by OP101 in FIG. 13 as indicated by DL112. By going through these steps, the relationship of output requests illustrated in FIG. 13 is changed to the one shown in FIG. 14.

Figure 14:
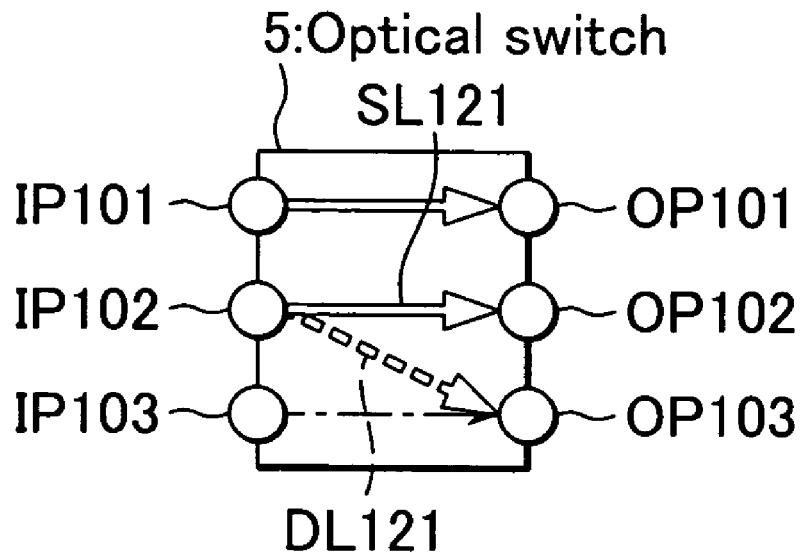
FIG. 14 is yet another schematic view explaining an example of conflict avoidance action when optical input signals are simultaneously input to the three input ports of an optical switch.

Similarly, the number of output requests to the output port indicated by OP102 in FIG. 14, which is the second output port, has been decreased from "two" to "one" due to steps S005 and S006 of FIG. 7 taken for the output port indicated by OP101 in FIG. 14.

Consequently, in step S003 of FIG. 7, controller 8 assigns the only input port indicated by IP102 in FIG. 14 that has an output request to the output port indicated by OP102, to that output port, as indicated by SL121.

Then, in steps S005 and S006 of FIG. 7, controller 8 cancels the output request from the assigned input port indicated by IP102 in FIG. 14 as indicated by DL121 in FIG. 14. By going through these steps, the relationship of output requests illustrated in FIG. 14 is changed to the one shown in FIG. 15.

Figure 15:
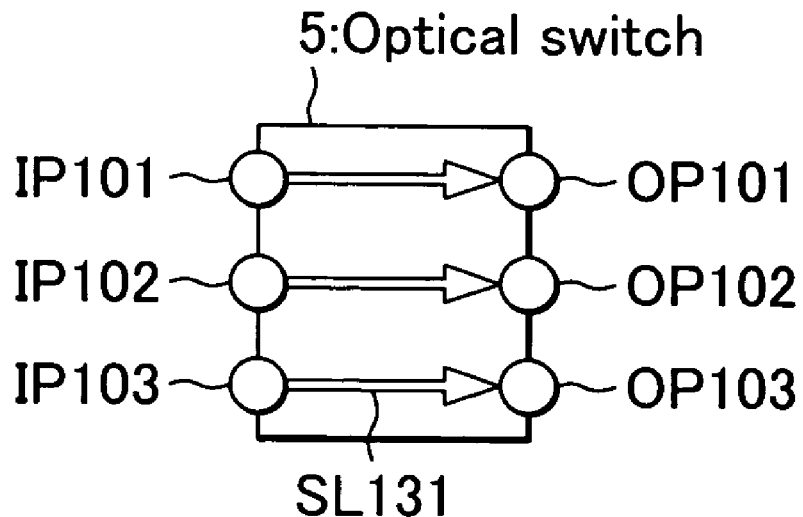
FIG. 15 is yet another schematic view explaining an example of conflict avoidance action when optical input signals are simultaneously input to the three input ports of an optical switch.

Finally, the number of output requests to the output port indicated by OP103 in FIG. 15, which is the third output port, has been decreased from "two" to "one" due to steps S005 and S006 of FIG. 7 taken for the output ports indicated by OP101 and OP102 in FIG. 15.

Consequently, in step S003 of FIG. 7, controller 8 assigns the only input port indicated by IP103 in FIG. 15 that has an output request to the output port indicated by OP103, to that output port, as indicated by SL131.

As an ultimate result, the input ports indicated by IP101, IP102 and IP103 in FIG. 15 are efficiently assigned to the output ports indicated by OP101, OP102 and OP103 in FIG. 15, thus making it possible to prevent optical signals from conflicting with each other.

Consequently, by allowing controller 8 to sort the output ports of optical switch 5 in ascending order of the number of output requests from the input ports of optical switch 5 and to assign the input ports in sequence according to the results of sorting, it is possible to prevent optical input signals from conflicting with each other and to efficiently assign optimum optical paths, even if a plurality of optical input signals are simultaneously applied to the input ports.

It should be noted that although the embodiment shown in FIG. 6 illustrates a case where optical switch 5 has three input ports and three output ports, it is possible for the optical switch to have an arbitrary number of input pots and an arbitrary number of output ports.

It should also be noted that although the embodiment shown in FIG. 6 illustrates a case, for the sake of simpler description, where optical switch 5 satisfies the relationship of "m=n", where m is the number of input ports and n is the number of output ports, the relationship between these two variables can be "m>n" or "m<n".

Although the embodiment shown in FIG. 6 illustrates a case where the electrical output signal, which is the output of optical-electrical conversion means 4, is represented by a single signal line, it is possible to output routing information for each optical input signal in a parallel mode. Needless to say, the routing information for each optical input signal can be output in a serial mode, as illustrated in the embodiment shown in FIG. 6.

Although the embodiment shown in FIG. 6 illustrates a case, for the sake of simpler description, where optical delay means 3 has three channels (multi-channel), it is of course possible to provide optical delay means separately for each optical input signal.

Although the embodiment shown in FIG. 6 illustrates a case, for the sake of simpler description, where optical-electrical conversion means 4 has three channels (multi-channel), it is of course possible to provide optical-electrical conversion means separately for each optical input signal.

Although the embodiment shown in FIG. 6 illustrates a case where the output ports of optical switch 5 are sorted in ascending order of the number of output requests from the input ports of optical switch 5 and the input ports are assigned in sequence according to the results of sorting, it is possible to select one input port in an arbitrary order from the plurality of input ports having output requests to a given output port and assign that input port to the output port, without carrying out the abovementioned sorting.

It is also possible to define an order of priority for optical input signals, so that an input port to which an optical input signal of higher priority is applied is preferentially assigned to an output port, according to the priority order of the optical input signal applied to the input port. As a method of defining the priority order, it is possible, for example, to add priority order information to the header part of each optical input signal.

In that case, preferentially assigning an input port of higher priority when selecting one input port from a plurality of input ports having output requests to the output ports increases the possibility of the higher-priority optical input signal being transmitted to a subsequent-stage optical router. In contrast, an optical input signal of lower priority is blocked and, therefore, the possibility of the optical input signal being transmitted to a subsequent-stage optical router decreases.

It is also possible to define an order of priority for the destinations of optical input signals, so that an input port to which an optical input signal with a destination of higher priority is applied is preferentially assigned to an output port, according to the priority order of the destinations of the optical input signal applied to the input port. As a method of defining the priority order of destinations, it is possible, for example, to add information on the priority order of destinations to the header part of each optical input signal.

In that case, preferentially assigning an output port of higher priority, among a plurality of output ports (subsequent-stage optical routers) selected for a given input port to transmit to the destination thereof through the shortest path, increases the possibility of the optical input signal with a higher-priority destination being transmitted to an output port with a higher-priority destination (subsequent-stage optical router). In contrast, the possibility of the optical input signal being transmitted to an output port with a lower-priority destination (subsequent-stage optical router) decreases.

In the embodiment shown in FIG. 6, a case is also illustrated wherein controller 8 takes such measures as sending information indicating an abnormal end of conflict avoidance, to the destination optical router, if not all of the output requests from input ports are cancelled, thus making it possible to notify a pre-stage optical router that a conflict between optical signals has occurred.

In that case, it does not matter whether the abovementioned information is sent to source optical routers that have transferred all (three) of the optical input signals or only to the source optical router whose output request has not been cancelled, or in other words, only to the source optical router that has transferred an optical input signal that was not output to any subsequent-stage optical router.

As is evident from the description given above, the following advantageous effects are provided according to the present invention.

By selecting one input port in an arbitrary order from a plurality of input ports having output requests to a given output port and assigning that input port to the output port or by sorting the output ports in ascending order of the number of output requests from the input ports of an optical switch and assigning the input ports in sequence according to the results of sorting, it is possible to prevent optical input signals from conflicting with each other and to efficiently assign optimum optical paths, even if a plurality of optical input signals are simultaneously applied to the input ports.

Another advantageous effect is that preferentially assigning an input port of higher priority when selecting one input port from a plurality of input ports having output requests to the output ports, increases the possibility of the higher-priority optical input signal being transmitted to a subsequent-stage optical router. In contrast, an optical input signal of lower priority is blocked and, therefore, the possibility of the optical input signal being transmitted to a subsequent-stage optical router decreases.

Yet another advantageous effect is that preferentially assigning an output port of higher priority, among a plurality of output ports (subsequent-stage optical routers) selected for a given input port to transmit to the destination thereof through the shortest path, increases the possibility of the optical input signal with a higher-priority destination being transmitted to an output port with a higher-priority destination (subsequent-stage optical router). In contrast, the possibility of the optical input signal being transmitted to an output port with a lower-priority destination (subsequent-stage optical router) decreases.

Yet another advantageous effect is that by taking such measures as sending information indicating an abnormal end of conflict avoidance, to the source optical router, if not all of the output requests from input ports are cancelled, it is possible to notify a pre-stage optical router that a conflict between optical signals has occurred.

What is claimed is:

1. An optical router for selecting optical paths for optical signals transmitting through an optical transmission line disposed on an optical node basis, outputting said optical signals, and thereby forming an optical communications network, said optical router comprising:
    optical delay means for delaying a plurality of said optical signals containing routing information added to header parts thereof;
    an optical switch provided with a plurality of input ports to which a plurality of optical outputs are input from said optical delay means and a plurality of output ports for outputting said optical signals;
    optical-electrical conversion means for converting a plurality of said optical signals to electrical signals;
    memory wherein path control information is stored; and
    a controller for finding said path control information according to said routing information extracted from an output of said optical-electrical conversion means, determining the destinations of said optical signals based on output requests therefrom, and selecting and assigning one input port in sequence from a single or plural input ports having output requests to a plurality of said output ports according to results of sorting a plurality of said output ports in ascending order of the number of output requests from said input ports.

2. The optical router of claim 1, wherein said controller sorts a plurality of said output ports in ascending order of the number of output requests from said input ports, examines said output ports in sequence according to the results of said sorting, assigns the only input port that has an output request to the output port in question if said output port proves to have only one output request, selects one input port from a plurality of input ports having output requests if said output port proves to have a plurality of output requests, thus assigning said one input port to said output port, cancels both an output request from said input port thus assigned and an output request to said output port to which said input port has been assigned.

3. The optical router of claim 2, wherein said controller sends information indicating an abnormal end of conflict avoidance to a source optical router if not all output requests from said input ports have been cancelled.

4. The optical router of claim 3, wherein said controller sends said information to all source optical routers that transfer said optical signals.

5. The optical router of claim 3, wherein said controller sends said information to those source optical routers whose output requests have not been cancelled.

6. The optical router of claim 1 or 2, wherein said controller preferentially assigns an input port, to which an optical signal with higher priority, among said optical signals, has been input, to a given output port, according to priority order information added to said optical signals.

7. The optical router of claim 6, wherein said priority order information is added to the header parts of said optical signals.

8. The optical router claim 1 or 2, wherein said controller preferentially assigns an input port to which an optical signal directed at an output port defined as a destination of higher priority, among said optical signals, has been applied, according to the priority order of destinations added to said optical signals.

9. The optical router of claim 8, wherein said priority order of destinations is added to the header parts of said optical signals.

* * * * *